United States Patent
Jung et al.

(10) Patent No.: US 10,996,881 B2
(45) Date of Patent: May 4, 2021

(54) STORAGE DEVICE AND METHOD OF OPERATING THE SAME

(71) Applicant: SK hynix Inc., Gyeonggi-do (KR)

(72) Inventors: Seung Wan Jung, Gyeonggi-do (KR); So Hee Kim, Gyeonggi-do (KR); Seung Ok Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/534,708

(22) Filed: Aug. 7, 2019

(65) Prior Publication Data
US 2020/0201547 A1 Jun. 25, 2020

(30) Foreign Application Priority Data

Dec. 19, 2018 (KR) .................... 10-2018-0165679

(51) Int. Cl.
*G06F 3/06* (2006.01)
*G06F 12/02* (2006.01)
*G06F 12/0802* (2016.01)

(52) U.S. Cl.
CPC ............ *G06F 3/064* (2013.01); *G06F 3/0607* (2013.01); *G06F 3/0652* (2013.01); *G06F 3/0656* (2013.01); *G06F 12/0246* (2013.01); *G06F 12/0802* (2013.01); *G06F 3/0679* (2013.01)

(58) Field of Classification Search
CPC . G06F 3/06; G06F 12/10; G06F 12/02; G06F 12/08
USPC .......................................... 711/154
See application file for complete search history.

(56) References Cited

U.S. PATENT DOCUMENTS

| 10,001,924 | B2* | 6/2018 | Sharma | G06F 3/0679 |
|---|---|---|---|---|
| 2008/0307152 | A1* | 12/2008 | Nakanishi | G06F 12/0246 711/102 |
| 2014/0025921 | A1* | 1/2014 | Yuan | G06F 12/1009 711/206 |
| 2015/0248244 | A1* | 9/2015 | Seo | G06F 3/064 711/103 |
| 2019/0344686 | A1* | 11/2019 | Kavanagh | B60N 2/305 |

FOREIGN PATENT DOCUMENTS

| KR | 10-2015-0093006 | 8/2015 |
|---|---|---|
| KR | 10-1861170 | 5/2018 |

* cited by examiner

*Primary Examiner* — Christopher B Shin
(74) *Attorney, Agent, or Firm* — IP & T Group LLP

(57) ABSTRACT

Provided herein may be a storage device and a method of operating the storage device. The storage device may include a memory device including buffer blocks and main blocks, and a memory controller configured to control the memory device. The memory controller may include: a buffer block controller configured to control the memory device to store, in at least one of the main blocks, data stored in at least one of the buffer blocks; a mapping table manager configured to generate a P2P mapping table including mapping information between a buffer address that is a physical address of the at least one buffer block and a main address that is a physical address of the at least one main block; and a read operation controller configured to control, when a read request is received, the memory device to read the data based on the main address or the buffer address.

19 Claims, 14 Drawing Sheets

FIG. 7
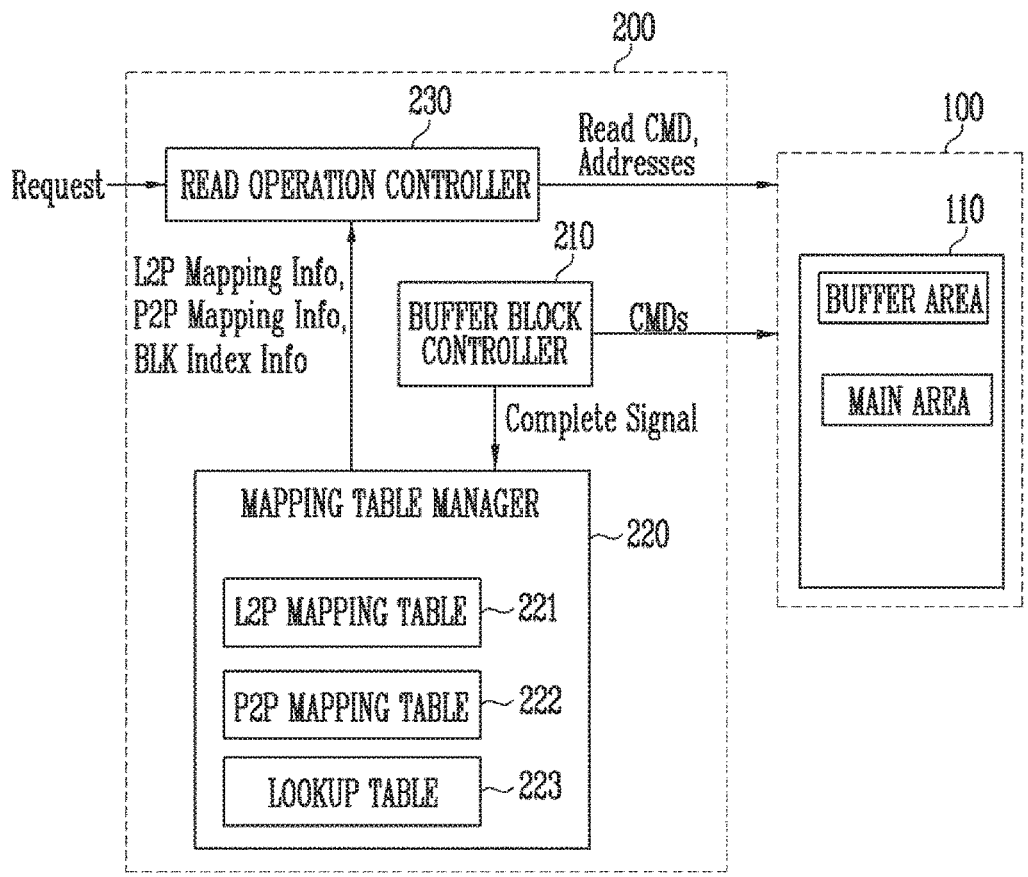
FIG. 8
(a) BUFFER AREA
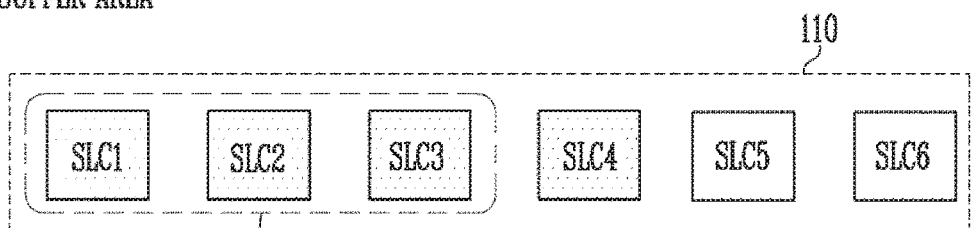
(b) MAIN AREA
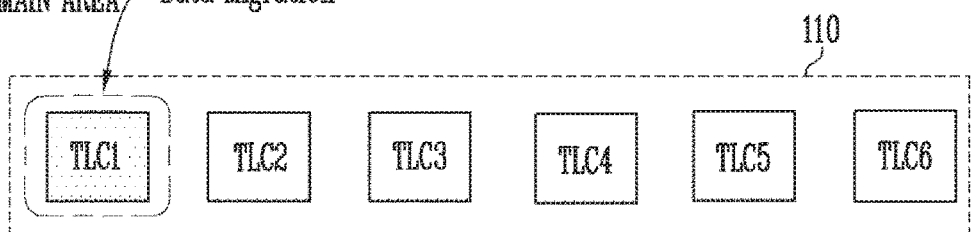

FIG. 9

(a) L2P MAPPING TABLE

| LBA # | PBA_S # |
|---|---|
| LBA 1 | PBA_S 1 — SLC 1 |
| LBA 2 | PBA_S 2 |
| LBA 3 | PBA_S 3 — SLC 2 |
| LBA 4 | PBA_S 4 |
| LBA 5 | PBA_S 5 — SLC 3 |
| LBA 6 | PBA_S 6 |
| LBA 7 | PBA_S 7 — SLC 4 |

Data Migration (SLC 1, 2, 3 —> TLC1)

| LBA # | PBA_T # |
|---|---|
| LBA 1 | PBA_T 1 — TLC 1 |
| LBA 2 | PBA_T 2 |
| LBA 3 | PBA_T 3 |
| LBA 4 | PBA_T 4 |
| LBA 5 | PBA_T 5 |
| LBA 6 | PBA_T 6 |
| LBA 7 | PBA_S 7 — SLC 4 |

(b) P2P MAPPING TABLE

| PBA_T # | PBA_S # |
|---|---|
| PBA_T 1 — TLC 1 | PBA_S 1 — SLC 1 |
| PBA_T 2 | PBA_S 2 |
| PBA_T 3 | PBA_S 3 — SLC 2 |
| PBA_T 4 | PBA_S 4 |
| PBA_T 5 | PBA_S 5 — SLC 3 |
| PBA_T 6 | PBA_S 6 |

(c) LOOKUP TABLE

| Lookup Index |
|---|
| TLC 1 |

STORAGE DEVICE AND METHOD OF OPERATING THE SAME

CROSS-REFERENCE TO RELATED APPLICATION

The present application claims priority under 35 U.S.C. § 119(a) to Korean patent application number 10-2018-0165679, filed on Dec. 19, 2018, which is incorporated herein by reference in its entirety.

BACKGROUND

Field of Invention

Various embodiments of the present disclosure generally relate to an electronic device, and more particularly, to a storage device and a method of operating the storage device.

Description of Related Art

Generally, a storage device stores data under control of a host device such as a computer or a smartphone. A storage device may include a memory device configured to store data, and a memory controller configured to control the memory device. Memory devices are mainly classified into volatile memory devices and nonvolatile memory devices.

A volatile memory device stores data only when power is supplied thereto; data stored therein is lost when power is turned off. Examples of a volatile memory device include a static random access memory (SRAM), and a dynamic random access memory (DRAM).

In a nonvolatile memory device, data stored therein is maintained even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the present disclosure are directed to a storage device having improved read performance, and a method of operating the storage device.

An embodiment of the present disclosure may provide for a memory controller configured to control a memory device including a plurality of buffer blocks and a plurality of main blocks, the memory controller including: a buffer block controller configured to control the memory device to store, in at least one main block of the plurality of main blocks, data stored in at least one buffer block of the plurality of buffer blocks; a mapping table manager configured to generate a physical-to-physical (P2P) mapping table including mapping information between a buffer address that is a physical address of the at least one buffer block in which the data has been stored and a main address that is a physical address of the at least one main block in which the data has been stored; and a read operation controller configured to control, when a read request for the data is received from a host, the memory device to read the data based on the main address or the buffer address included in the P2P mapping table.

An embodiment of the present disclosure may provide for a storage device including: a memory device including a plurality of buffer blocks and a plurality of main blocks; and a memory controller configured to control the memory device to: store, in at least one main block of the plurality of main blocks, data stored in at least one buffer block of the plurality of buffer blocks; generate, when the data is stored in the at least one main block, a physical-to-physical (P2P) mapping table including mapping information between a buffer address that is a physical address of the at least one buffer block and a main address that is a physical address of the at least one main block; and read, when a read request for the data is received from the host, the data based on the main address or the buffer address included in the P2P mapping table.

An embodiment of the present disclosure may provide for a method of operating a storage device including a memory device including a plurality of buffer blocks and a plurality of main blocks, and a memory controller configured to control the memory device, the method including: reading data stored in at least one buffer block of the plurality of buffer blocks; storing data obtained by reading the stored data in at least one main block of the plurality of main blocks; generating a physical-to-physical (P2P) mapping table including mapping information between a buffer address that is a physical address of the at least one buffer block and a main address that is a physical address of the at least one main block; and reading, when a read request for the data is received from a host, the data based on the main address or the buffer address included in the P2P mapping table.

An embodiment of the present disclosure may provide for a memory system, the memory system comprising: a memory device including a first memory region of lower-density storage and a second memory region of higher-density storage, and a controller that: controls the memory device to copy data from the first memory region into the second memory region, updates first map information indicating a logical address mapped to a first physical address representing where the data is stored in the first memory region to replace the first physical address with a second physical address representing from where the data was copied in the second memory region, generates second map information indicating the first physical address mapped to the second physical address, and accesses the first memory region when the first map information indicates the second physical address mapped to an access-requested logical address and the second map information indicates the first physical address mapped to the second physical address.

BRIEF DESCRIPTION OF THE DRAWINGS

FIG. 7 is a diagram illustrating a configuration and operation of the memory device and the memory controller in accordance with an embodiment of the present disclosure.

FIG. 8 is a diagram illustrating a data migration operation in accordance with an embodiment of the present disclosure.

FIG. 9 is a diagram illustrating an L2P mapping table, a P2P mapping table, and a lookup table which are generated by a mapping table manager, such as that of FIG. 7.

DETAILED DESCRIPTION

Figure 1:
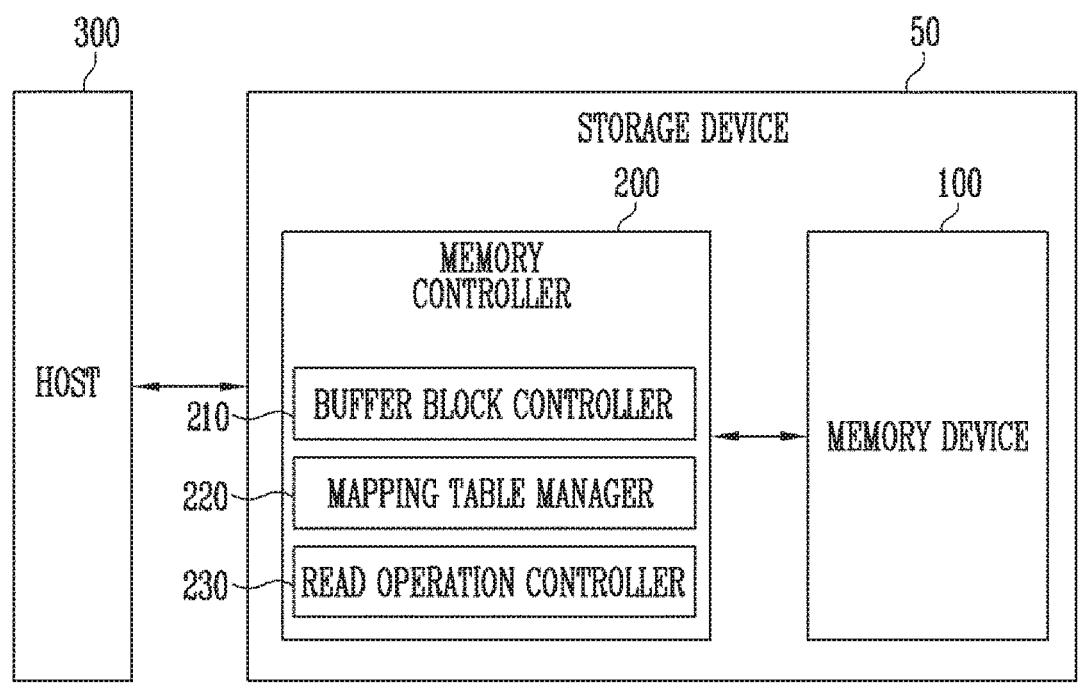
FIG. 1 is a diagram illustrating a storage device in accordance with an embodiment of the present disclosure.

Specific structural and functional description provided herein is directed to various embodiments of the present disclosure. The description, however, should not be construed as being limited to the various embodiments described herein.

The present invention may be embodied in many different forms and should not be construed as being limited to only the embodiments set forth herein. Rather, the present invention is intended to cover not only the disclosed embodiments, but also various alternatives, modifications, equivalents and other embodiments that fall within the spirit and scope of the present disclosure.

It will be understood that, although the terms "first", "second", etc. may be used herein to identify various elements, these elements should not be limited by these terms. These terms are only used to distinguish one element from another element that otherwise have the same or similar names. For example, a first element in one instance could be termed a second element in another instance without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art will be omitted to avoid obscuring the subject matter of the present disclosure. This aims to make the subject matter of the present disclosure clear.

The present disclosure is explained in detail below in the context of various embodiments with reference to the accompanying drawings. Throughout the specification, reference to "an embodiment," "another embodiment" or the like is not necessarily to only one embodiment, and different references to any such phrase are not necessarily to the same embodiment(s).

FIG. 1 is a diagram illustrating a storage device 50 in accordance with an embodiment of the present disclosure.

Referring to FIG. 1, the storage device 50 may include a memory device 100 and a memory controller 200 configured to control the operation of the memory device 100. The storage device 50 may be configured to store data under control of a host 300 such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication system with the host 300. For example, the data storage device 50 may be configured as any of an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any of various package types. For instance, the storage device 50 may be manufactured as any of a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory device 100 may store data therein. The memory device 100 may operate under control of the memory controller 200. The memory device 100 may include a memory cell array including a plurality of memory cells configured to store data therein.

The memory cells may include a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100. Each memory block may be the unit of erasing data.

In an embodiment, the memory cell array of the memory device 100 may include a main area and a buffer area. Memory blocks included in the main area may be main blocks. Memory blocks included in the buffer area may be buffer blocks. Data stored in the buffer blocks may be stored in the main blocks. In an embodiment, when the memory device 100 is in an idle status, the data stored in the buffer blocks may be stored in the main blocks. Thereafter, the data stored in the buffer blocks may be deleted.

Each of the memory cells of the buffer blocks may store n data bits (n is a natural number of 1 or more). Each of the memory cells of the main blocks may store m data bits (m is a natural number greater than n). As the number of data bits stored in a memory cell is reduced, the speed of reading data from the memory cell may be increased. Therefore, the speed of reading data from the buffer block may be higher than the speed of reading the identical data from the main block.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In this specification, by way of example, aspects of the present invention are described in a context in which the memory device 100 is a NAND flash memory.

The memory device 100 may receive a command and an address from the memory controller 200 and access an area of the memory cell array that is selected by the address. In other words, the memory device 100 may perform an operation corresponding to the command on the area selected by the address. For example, the memory device 100 may perform a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which data is to be stored, the memory cells being included in the memory device 100.

The memory controller 200 may control the memory device 100 to perform a program operation, a read operation, or an erase operation in response to a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a program command, an address and data in the absence of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control two or more memory devices 100. In this case, the memory controller 200 may control the memory devices 100 in an interleaving manner so as to enhance the operating performance. The interleaving scheme may enable operating periods of two or more memory devices 100 to overlap.

In an embodiment, the memory controller 200 may include a buffer block controller 210, a mapping table manager 220, and a read operation controller 230.

The buffer block controller 210 may store, in at least one of the main blocks, data stored in at least one of the buffer blocks. In detail, the buffer block controller 210 may read data stored in at least one buffer block and store the read data in at least one main block. When the memory device 100 is in an idle status, the buffer block controller 210 may store, in at least one main block, data stored in at least one buffer block.

When receiving a write request to store data in a buffer block from the host 300, the buffer block controller 210 may control the memory device 100 to erase the buffer block. The buffer block controller 210 may control the memory device 100 to store the data corresponding to the write request in the erased buffer block.

When data is stored in a buffer block, the mapping table manager 220 may generate a logical-to-physical (L2P) mapping table. The L2P mapping table may include mapping information between a logical address of the data provided from the host and a buffer address, which is a physical address of the buffer block in which the data is stored.

The mapping table manager 220 may update the L2P mapping table if the data stored in the buffer block is stored in the main block. In detail, the mapping table manager 220 may update a physical address mapped with a logical address of data included in the L2P mapping table from a buffer address to a main address which is a physical address of the main block.

The mapping table manager 220 may generate a P2P mapping table if the data stored in the buffer block is stored in the main block. The P2P mapping table may include mapping information between the main address and the buffer address. The mapping table manager 220 may generate a lookup table based on the P2P mapping table. The lookup table may store an index of the main block that is indicated by the main address.

The read operation controller 230 may control the memory device 100 such that, when a read request for the data stored in the buffer block or the main block is received from the host 300, the memory device 100 reads the data. The read operation controller 230 may control the memory device 100 to read the data based on the L2P mapping table.

In an embodiment, the read operation controller 230 may search a physical address mapped with a logical address of data provided by the host, with reference to the L2P mapping table. If the searched physical address is a buffer address, the read operation controller 230 may control the memory device 100 such that the memory device 100 reads data with reference to the buffer address.

If the searched physical address is a main address, the read operation controller 230 may determine whether the main address is included in the P2P mapping table. The read operation controller 230 may determine whether the main address is included in the P2P mapping table based on the lookup table. If the index of the memory block that is indicated by the main address is included in the lookup table, the read operation controller 230 may determine that the main address is included in the P2P mapping table.

If the main address is included in the P2P mapping table, the read operation controller 230 may control the memory device 100 such that the memory device 100 reads the data based on a buffer address mapped with the main address. If the main address is not included in the P2P mapping table, the read operation controller 230 may control the memory device 100 such that the memory device 100 reads the data based on the main address included in the L2P mapping table.

The host 300 may communicate with the storage device 50 using at least one of various communication methods, such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
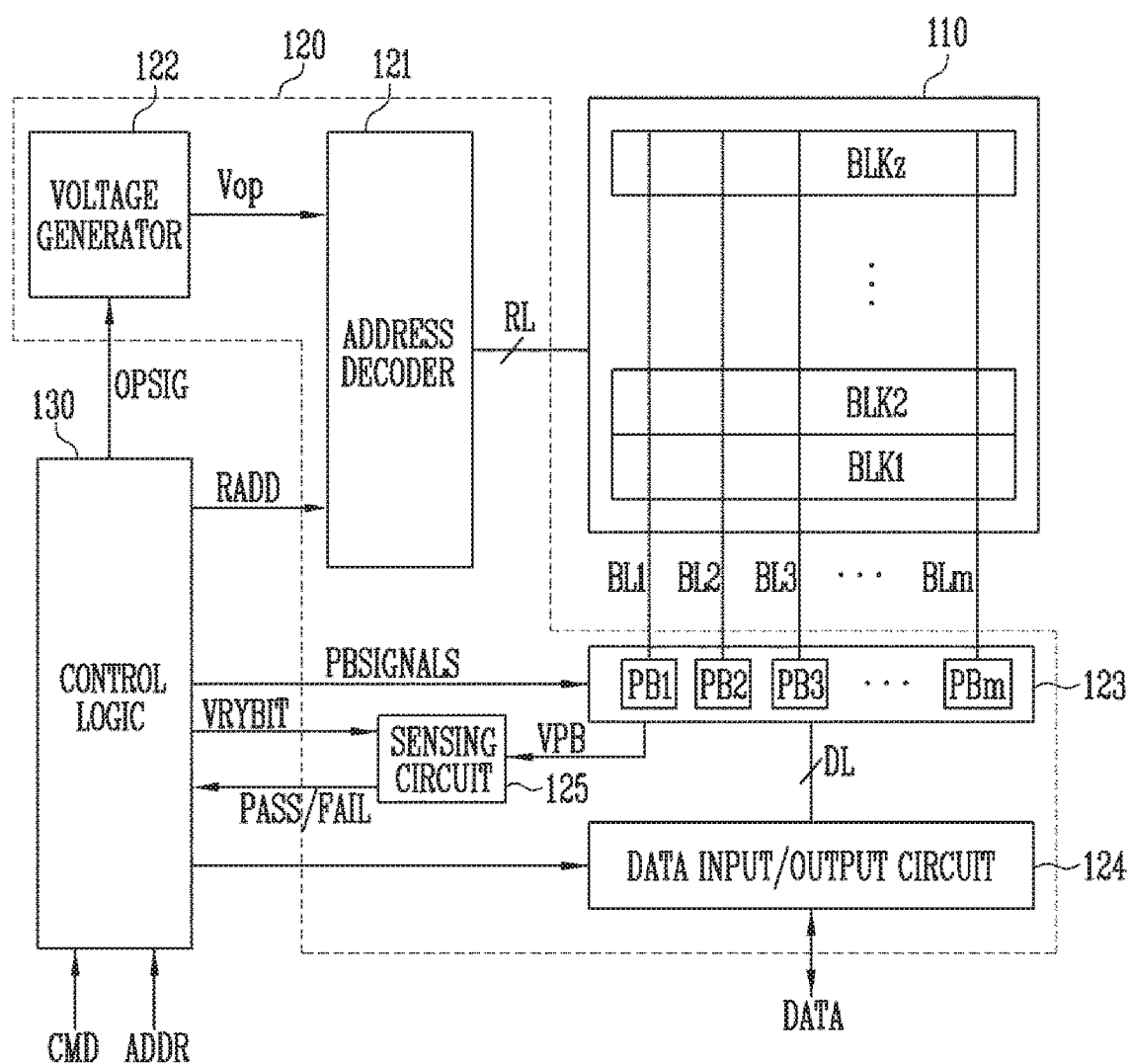
FIG. 2 is a diagram illustrating a configuration of a memory device, such as that of FIG. 1.

FIG. 2 is a diagram illustrating a configuration of the memory device 100 of FIG. 1.

Referring to FIG. 2, the memory device 100 may include a memory cell array 110, a peripheral circuit 120, and control logic 130.

The memory cell array 110 may include a plurality of memory blocks BLK1 to BLKz, which are coupled to an address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 may be formed of a plurality of pages. In an embodiment, each of the memory blocks BLK1 to BLKz included in the memory cell array 110 may include a plurality of dummy cells. Here, one or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

In an embodiment, the memory cell array 110 may include a main area and a buffer area. Memory blocks included in the main area may be main blocks. Memory blocks included in the buffer area may be buffer blocks. Data stored in the buffer blocks may be stored in the main blocks. In an embodiment, when the memory device 100 is in an idle status, the data stored in the buffer blocks may be stored in the main blocks. Thereafter, the data stored in the buffer blocks may be deleted. Each of the memory cells of the buffer blocks may store n data bits (n is a natural number of 1 or more). Each of the memory cells of the main blocks may store m data bits (m is a natural number greater than n).

The peripheral circuit 120 may include an address decoder 121, a voltage generator 122, a read/write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address RADD among the received addresses ADDR. The address decoder 121 may select at least one word line WL of the selected memory block by applying voltages supplied from the voltage generator 122 to at least one word line WL according to the decoded row address RADD.

During a program operation, the address decoder 121 may apply a program voltage to a selected word line and apply a program pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, so as to generate a plurality of operating voltages Vop having various voltage levels, a plurality of pumping capacitors configured to receive an internal supply voltage, and may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm, which may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program enable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA to the first to m-th page buffers PB1 to PBm.

During an erase operation, the read/write circuit 123 may float the bit lines BL. In an embodiment, the read/write circuit 123 may include a column select circuit.

In an embodiment, while data stored in some page buffers of the plurality of page buffers included in the read/write circuit 123 is programmed to the memory cell array 110, the other page buffers may receive new data from the memory controller 200 and store the new data.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving inputted data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm included in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control the overall operation of the memory device 100. The control logic 130 may operate in response to a command CMD transmitted from an external device.

The control circuit 130 may generate various signals in response to the command CMD and the address ADD and control the peripheral circuits 120. For example, the control logic 130 may generate an operating signal OPSIG, a row address RADD, a read/write circuit control signal PBSIGNALS, and an enable bit VRYBIT in response to the command CMD and the address ADD. The control logic 130 may output the operating signal OPSIG to the voltage generator 122, output the row address RADD to the address decoder 121, output the read/write control signal PBSIGNALS to the read/write circuit 123, and output the enable bit VRYBIT to the sensing circuit 125. Furthermore, the control logic 130 may determine whether target memory cells have passed or failed a verification during the verify operation in response to a pass signal PASS or a fail signal FAIL that is output from the sensing circuit 125.

Figure 3:
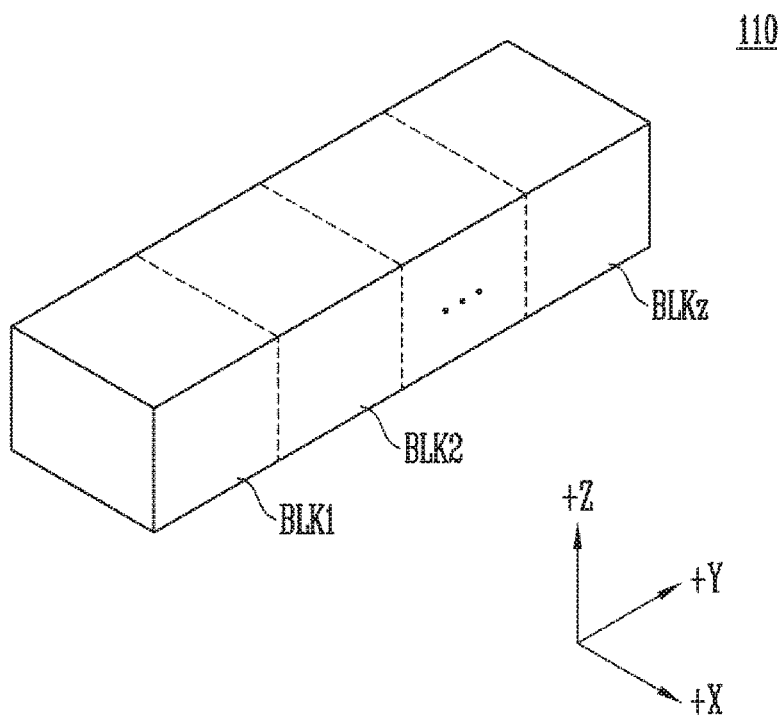
FIG. 3 is a diagram illustrating an embodiment of a memory cell array, such as that of FIG. 2.

FIG. 3 is a diagram illustrating an embodiment of the memory cell array 110 of FIG. 2.

Referring to FIG. 3, the memory cell array 110 may include a plurality of memory blocks BLK1 to BLKz. Each memory block has a three-dimensional structure. Each memory block may include a plurality of memory cells stacked on a substrate. The memory cells are arranged in a +X direction, a +Y direction, and a +Z direction. The structure of each memory block is described in more detail with reference to FIGS. 4 and 5.

Figure 4:
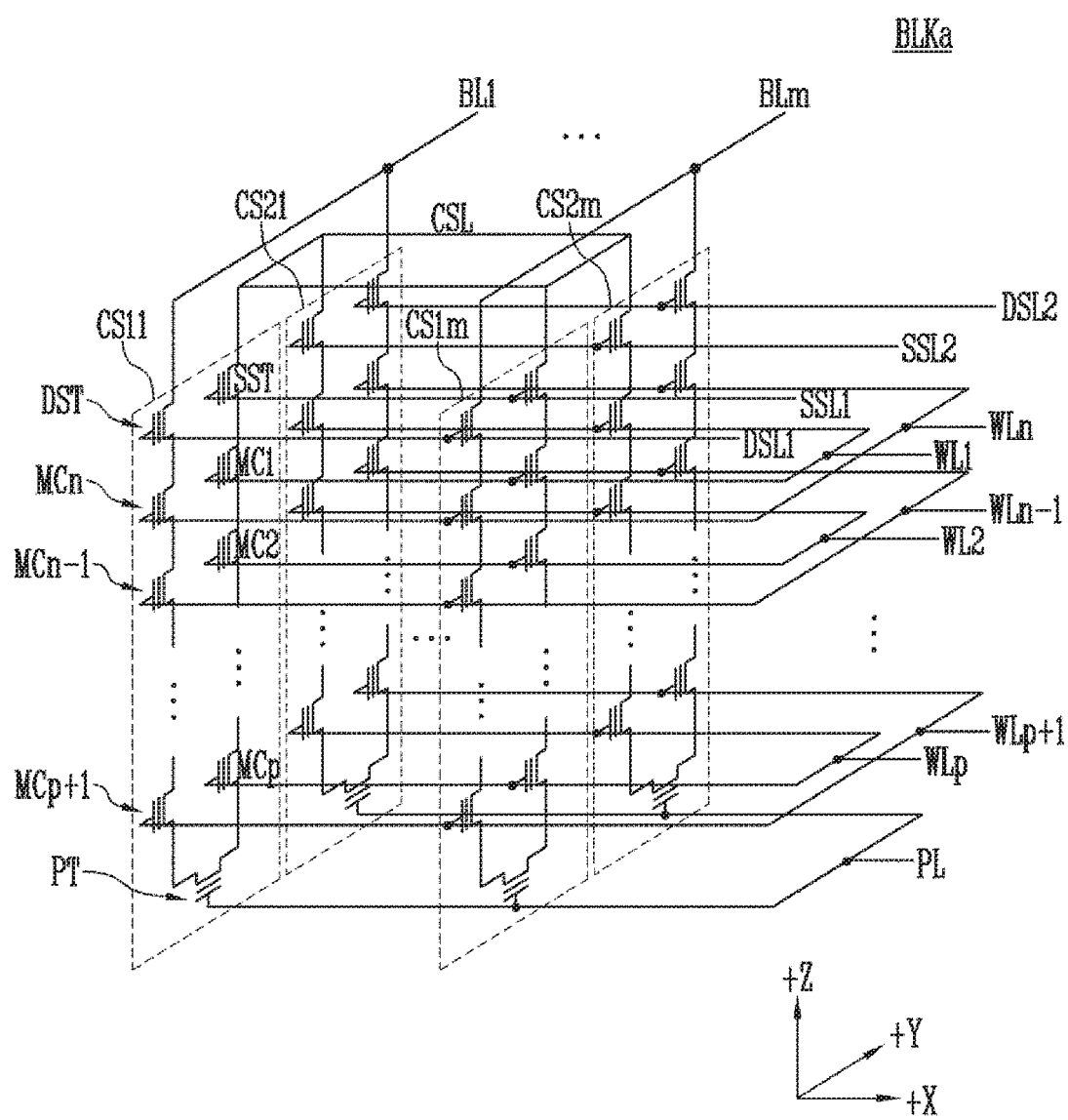
FIG. 4 is a circuit diagram illustrating a representative memory block BLKa of memory blocks BLK1 to BLKz of FIG. 3, in accordance with an embodiment of the present disclosure.

FIG. 4 is a circuit diagram illustrating a representative memory block BLKa of memory blocks BLK1 to BLKz of FIG. 3, in accordance with an embodiment of the present disclosure.

Referring to FIG. 4, the memory block BLKa may include a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings may be arranged in a row direction (i.e., the +X direction). In FIG. 4, two cell strings are illustrated as being arranged in a column direction (i.e., the +Y direction). However, this illustration is for clarity; it will be understood that three or more cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1$m$ in a first row are coupled to a first source select line SSL1. Source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a-Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1$m$ in the first row are coupled to a first drain select line DSL1. Drain select transistors of the cell strings CS21 to CS2$m$ in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1$m$ and CS2$m$ in an m-th column are coupled to an m-th bit line BL$m$.

Memory cells coupled to the same word line in cell strings arranged in the row direction form a single page. For example, memory cells coupled to the first word line WL1, among the cell strings CS11 to CS1$m$ in the first row, form a single page. Memory cells coupled to the first word line WL1, among the cell strings CS21 to CS2$m$ in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BL$m$. Even-number-th cell strings of the cell strings CS11 to CS1$m$ or CS21 to CS2$m$ arranged in the row direction may be coupled to the respective even bit lines. Odd-number-th cell strings of the cell strings CS11 to CS1$m$ or CS21 to CS2$m$ arranged in the row direction may be coupled to the respective odd bit lines.

In an embodiment, at least one of the first to n-th memory cells MC1 to MCn may be used as a dummy memory cell. For example, dummy memory cell(s) may be provided to reduce an electric field between the source select transistor SST and the memory cells MC1 to MCp. Alternatively, dummy memory cell(s) may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the dummy memory cell(s), each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 5:
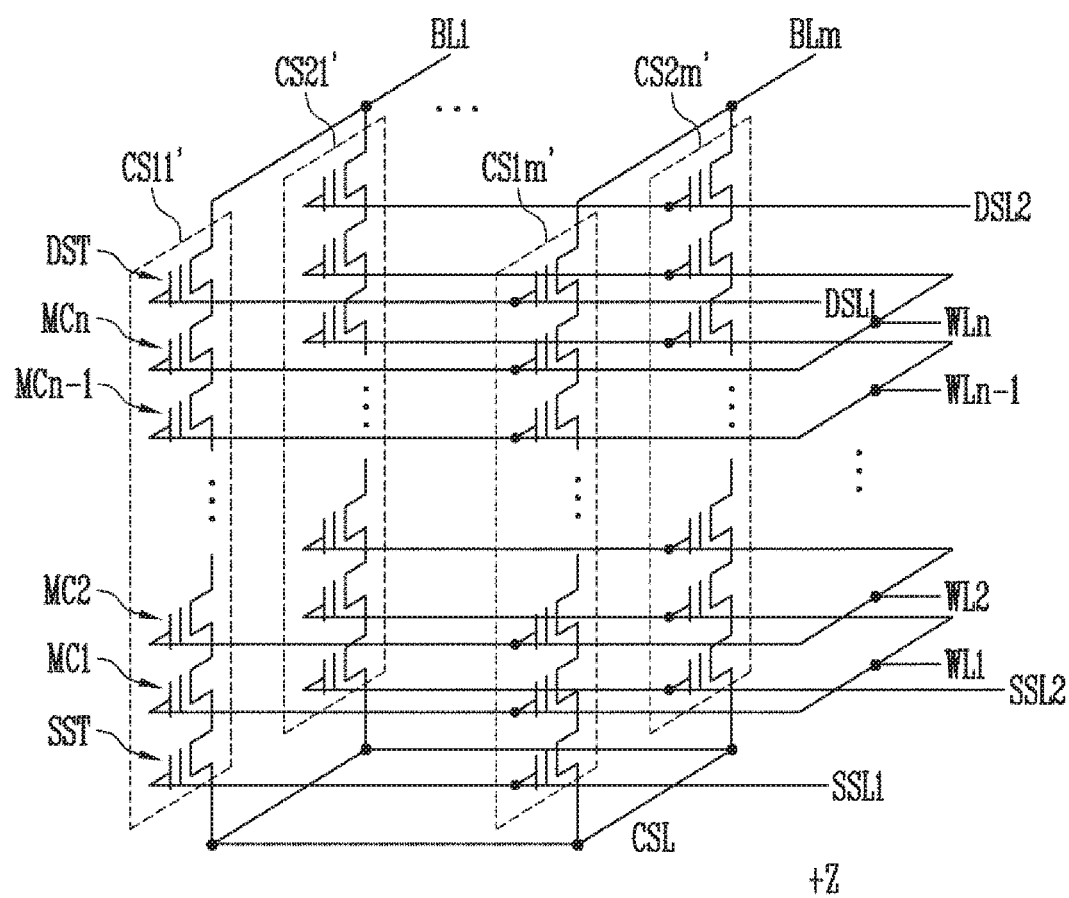
FIG. 5 is a circuit diagram illustrating a representative memory block BLKb of the memory blocks BLK1 to BLKz of FIG. 3, in accordance with an embodiment of the present disclosure.

FIG. 5 is a circuit diagram illustrating a representative memory block BLKb of the memory blocks BLK1 to BLKz of FIG. 3, in accordance with an embodiment of the present disclosure.

Referring to FIG. 5, the memory block BLKb may include a plurality of cell strings CS11' to CS1$m$' and CS21' to CS2$m$'. Each of the cell strings CS11' to CS1$m$' and CS21' to CS2$m$' extends in the +Z direction. Each of the cell strings CS11' to CS1$m$' and CS21' to CS2$m$' may include at least one source select transistor SST, first to n-th memory cells MC1 to MCn, and at least one drain select transistor DST which are stacked on a substrate (not shown) provided in a lower portion of the memory block BLKb.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1$m$' arranged in a first row may be coupled to a first source select line SSL1. Source select transistors of the cell strings CS21' to CS2$m$' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 5 may have an equivalent circuit similar to that of the memory block BLKa of FIG. 4 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, dummy memory cell(s) may be provided to reduce an electric field between the source select transistor SST and the memory cells MC1 to MCn. Alternatively, dummy memory cell(s) may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the dummy memory cell(s), each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 6:
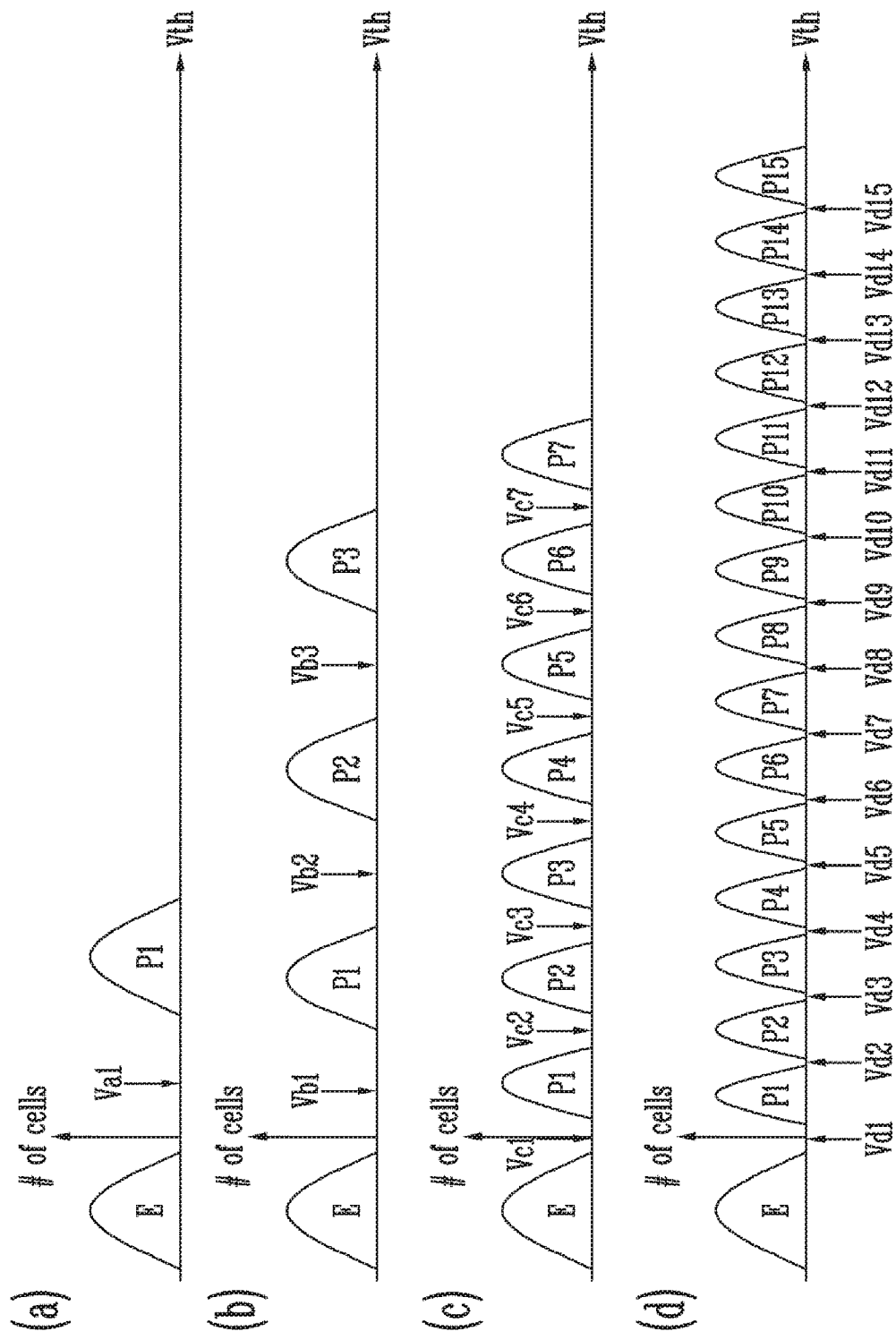
FIG. 6 is a diagram illustrating threshold voltage distributions of memory cells configured to store at least one data bit in accordance with an embodiment of the present disclosure.

FIG. 6 is a diagram illustrating threshold voltage distributions of memory cells configured to store at least one data bit in accordance with an embodiment of the present disclosure.

Referring to FIG. 6, the horizontal axis of each graph indicates the level of a threshold voltage, and the vertical axis thereof indicates the number of memory cells.

In graphs (a) to (d), it is assumed that the number of data bits that may be stored in each memory cell ranges 1 to 4. However, in another embodiment, more than 4 data bits may be stored in each memory cell.

Graph (a) illustrates threshold voltage distributions of single-level cells (SLCs), each of which is capable of storing a single data bit. A single-level cell may have an erased status E or a programmed status P1.

A read voltage Vat may distinguish the erased status E from the programmed status P1. When a single-level cell having the erased status E is read using the read voltage Vat, the single-level cell may be read as an ON cell. When a single-level cell having the programmed state P1 is read using the read voltage Vat, the single-level cell may be read as an OFF cell.

Graph (b) illustrates threshold voltage distributions of multi-level cells (MLCs), each of which is capable of storing two data bits. The multi-level cell may have any one status of an erased status E and first to third programmed statuses P1 to P3.

First to third read voltages Vb1 to Vb3 may distinguish the erased status E and the first to third programmed statuses P1 to P3 from each other. The first read voltage Vb1 may distinguish the erased status E from the first programmed status P1. The second read voltage Vb2 may distinguish the first programmed status P1 from the second programmed status P2. The third read voltage Vb3 may distinguish the second programmed status P2 from the third programmed status P3.

Depending on a result of reading a multi-level cell using the first to third read voltages Vb1 to Vb3, the multi-level cell may be determined to have any one status of the erased status E and the first to third programmed statuses P1 to P3.

Graph (c) illustrates threshold voltage distributions of triple-level cells (TLCs), each of which is capable of storing three data bits. The triple-level cell may have any one status of an erased status E and first to seventh programmed statuses P1 to P7.

First to seventh read voltages Vc1 to Vc7 may distinguish the erased status E and the first to seventh programmed statuses P1 to P7 from each other. The first read voltage Vc1 may distinguish the erased status E from the first programmed status P1. The second read voltage Vc2 may distinguish the first programmed status P1 from the second programmed status P2. Likewise, the seventh read voltage Vc7 may distinguish the sixth programmed status P6 from the seventh programmed status P7.

Depending on a result of reading a triple-level cell using the first to seventh read voltages Vc1 to Vc7, the triple-level cell may be determined to have any one status of the erased status E and the first to seventh programmed statuses P1 to P7.

Graph (d) illustrates threshold voltage distributions of quad-level cells (QLCs), each of which is capable of storing four data bits. The quad-level cell may have any one status of an erased status E and first to fifteenth programmed statuses P1 to P15.

First to fifteenth read voltages Vd1 to Vd15 may distinguish the erased status E and the first to fifteenth programmed statuses P1 to P15 from each other. The first read voltage Vd1 may distinguish the erased status E from the first programmed status P1. The second read voltage Vd2 may distinguish the first programmed status P1 from the second programmed status P2. Likewise, the fifteenth read voltage Vd15 may distinguish the fourteenth programmed status P14 from the fifteenth programmed status P15.

Depending on a result of reading a quad-level cell using the first to fifteenth read voltages Vd1 to Vd15, the quad-level cell may be determined to have any one status of the erased status E and the first to fifteenth programmed statuses P1 to P15.

Comparing graphs (a) to (d) with each other, as the number of data bits that may be stored in each memory cell is increased, the number of programmed statuses that may be represented by each memory cell and the number of read voltages for distinguishing the respective programmed statuses from each other may be increased. On the one hand, as the number of programmed states that may be represented by each memory cell is increased, the entire width in which the threshold voltage distributions corresponding to the respective programmed states are disposed may be increased. On the other hand, as the number of programmed states that may be represented by each memory cell is increased, the width of the threshold voltage distribution corresponding to each programmed state may be reduced.

FIG. 7 is a diagram illustrating a configuration and operation of the memory device 100 and the memory controller 200 in accordance with an embodiment of the present disclosure.

Referring to FIG. 7, the memory device 100 may include a memory cell array 110. The memory cell array 110 may include a buffer area and a main area.

Memory blocks included in the main area may be referred to as main blocks. Memory blocks included in the buffer area may be referred to as buffer blocks. Data stored in the buffer blocks may be stored in the main blocks. In an embodiment, when the memory device 100 is in an idle status, the data stored in the buffer blocks may be stored in the main blocks. Thereafter, the data stored in the buffer blocks may be deleted. Each of the memory cells of the buffer blocks may store n data bits (n is a natural number of 1 or more). Each of the memory cells of the main blocks may store m data bits (m is a natural number greater than n). That is, the memory cells in the main blocks have higher-density storage than the memory cells in the buffer blocks, which in turn gives the main blocks a higher storage capacity than the buffer blocks.

In an embodiment, the memory controller 200 may include a buffer block controller 210, a mapping table manager 220, and a read operation controller 230.

The buffer block controller 210 may store, in at least one of the main blocks, data stored in at least one of the buffer blocks.

In detail, the buffer block controller 210 may provide, to the memory device 100, a read command for reading data stored in at least one buffer block. The buffer block controller 210 may provide, to the memory device 100, a program command for storing read data obtained according to the read command in at least one main block.

The buffer block controller 210 may generate a migration complete signal (Complete Signal) when the data that has been stored in the at least one buffer block is stored in the at least one main block. The buffer block controller 210 may provide the generated migration complete signal to the mapping table manager 220.

When receiving a write request to store data in a buffer block from the host, the buffer block controller 210 may control the memory device 100 to erase the buffer block. The buffer block controller 210 may provide, to the memory device 100, an erase command for instructing the memory device 100 to perform an erase operation on the buffer block.

The buffer block controller 210 may control the memory device 100 to store the data corresponding to the write request in the erased buffer block. The buffer block controller 210 may provide, to the memory device 100, a program command for storing the data corresponding to the write request.

When data is stored in a buffer block, the mapping table manager 220 may generate an L2P mapping table 221. The L2P mapping table 221 may include mapping information between a logical address of the data provided from the host and a buffer address, which is a physical address of the buffer block in which the data is stored. Here, the mapping information may be L2P mapping information (L2P Mapping Info) indicating a mapping relationship between the logical address and the physical address.

The mapping table manager 220 may update the L2P mapping table 221 when the migration complete signal is received from the buffer block controller 210. In detail, the mapping table manager 220 may update the physical address mapped with the logical address of the data included in the L2P mapping table 221 from a buffer address to a main address which is a physical address of the main block.

The mapping table manager 220 may generate a P2P mapping table 222 when the migration complete signal is received from the buffer block controller 210. The P2P mapping table 222 may include mapping information between the main address and the buffer address. Here, the mapping information may be P2P mapping information (P2P Mapping Info) indicating a mapping relationship between the physical addresses.

The mapping table manager 220 may generate a lookup table 223 based on the P2P mapping table 222. The lookup table 223 may include the index of the main block. That is, the index may indicate the main address in the P2P mapping table.

The mapping table manager 220 may provide, to the read operation controller 230, the L2P mapping information included in the L2P mapping table 221. In detail, when the read operation controller 230 receives a read request (Request) from the host described with reference to FIG. 1, the mapping table manager 220 may provide, to the read operation controller 230, L2P mapping information corresponding to data required to be read.

The mapping table manager 220 may provide, to the read operation controller 230, the P2P mapping information stored in the P2P mapping table 222. When providing the L2P mapping information to the read operation controller 230, the mapping table manager 220 may provide the P2P mapping information along with the L2P mapping information thereto.

The mapping table manager 220 may provide block index information (BLK Index Info) to the read operation controller 230. The block index information may be information about the index of the main block that is included in the lookup table 223. When providing the P2P mapping information to the read operation controller 230, the mapping table manager 220 may provide the block index information along with the P2P mapping information thereto.

When receiving a read request (Request) to read data stored in the buffer block or the main block from the host, the read operation controller 230 may control the memory device 100 to read the data. The read operation controller 230 may also receive a logical address of the data along with the read request from the host.

The read operation controller 230 may generate a read command in response to a read request and provide the read command to the memory device 100. Here, the read operation controller may provide a physical address mapped with the logical address of the data to the memory device 100, with reference to the L2P mapping information provided from the mapping table manager 220. The memory device 100 may perform an operation of reading the data with reference to the received physical address.

In an embodiment, if the physical address mapped with the logical address of the data is a buffer address, the read operation controller 230 may provide the buffer address to the memory device 100. The buffer address may be a physical address of the buffer block in which the data is stored.

If the physical address mapped with the logical address is a main address, the read operation controller 230 may determine whether the main address is included in the P2P mapping table. The main address may be a physical address of the main block in which the data is stored.

In detail, the read operation controller 230 may determine whether the main address is included in the P2P mapping table 222, based on the block index information provided from the mapping table manager 220. If the index corresponding to the main address is included in the block index information, the read operation controller 230 may determine that the main address is included in the P2P mapping table 222.

If the main address is included in the P2P mapping table 222, the read operation controller 230 may provide the buffer address mapped with the main address to the memory device 100, with reference to the P2P mapping information provided from the mapping table manager 220. The memory device 100 may perform an operation of reading the data based on the received buffer address.

If the main address is not included in the P2P mapping table 222, the read operation controller 230 may provide the main address to the memory device 100. The memory device 100 may perform an operation of reading the data based on the received main address.

FIG. 8 is a diagram illustrating a data migration operation in accordance with an embodiment of the present disclosure.

Referring to FIG. 8, as shown in (a), the buffer area may include first to sixth buffer blocks SLC1 to SLC6. Each of the memory cells of the buffer blocks may be a single-level cell (SLC) which may store one data bit. As shown in (b), the main area may include first to sixth main blocks TLC1 to TLC6. Each of the memory cells of the main blocks may be a triple-level cell (TLC) which may store three data bits.

The number of buffer blocks included in the buffer area, the number of main blocks included in the main area, and the number of data bits which may be stored in each memory cell of a main block or each memory cell of a buffer block are not limited to those in the present embodiment.

Data stored in at least one of the buffer blocks may be stored in at least one of the main blocks. The number of data bits which may be stored in one memory cell of the main block may be greater than the number of data bits which may be stored in one memory cell of the buffer block. Therefore, data stored in two or more buffer blocks may be stored in one main block.

In an embodiment, a data migration operation of storing, in at least one main block, data that has been stored in at least one buffer block may be performed. The data migration operation may be performed when the memory device described with reference to FIG. 1 is in an idle status.

In an embodiment, data stored in one or more buffer blocks selected for a migration operation may be deleted. For example, when new data is stored in selected buffer block(s), existing data that has been stored in the selected block(s) may be deleted. Hence, to store new data in selected buffer block(s), the selected buffer block(s) may be erased. The new data may be programmed to the erased buffer block(s).

In FIG. 8, the memory blocks that are not shaded may be free blocks capable of storing new data. The memory blocks that are shaded may be memory blocks in which data has been already stored.

Therefore, in (a) of FIG. 8, each of the first to fourth buffer blocks SLC1 to SCL4 may be a memory block in which data has been already stored. The fifth and sixth buffer blocks SLC5 and SLC6 may be free blocks. In (b) of FIG. 8, the first main block TLC1 may be a memory block in which data has been already stored. Each of the second to sixth main blocks TLC2 to TLC6 may be a free block.

A data migration operation of storing, in the first main block TLC1, the data that has been stored in the first to third buffer blocks SLC1 to SLC3 may be performed. Each memory cell of the first main block TLC1 may be a triple-level cell, and each memory cell of the first to third buffer blocks SLC1 to SLC3 may be a single-level cell. Hence, data that has been stored in three buffer blocks SLC1 to SLC3 may be stored in one main block TCL1.

When the data migration operation is performed, the L2P mapping table described with reference to FIG. 7 may be updated. When the data migration operation is performed, the P2P mapping table and the lookup table may be generated.

FIG. 9 is a diagram illustrating an L2P mapping table, a P2P mapping table, and a lookup table which are generated by the mapping table manager 220 of FIG. 7.

Referring to FIGS. 8 and 9, (a) of FIG. 9 illustrates an L2P mapping table including mapping information between logical addresses LBA of data and physical addresses of memory blocks in which the data is stored. The logical addresses LBA of the data may be provided from the host described with reference to FIG. 1. A physical address of each main block may be a main address. A physical address of each buffer block may be a buffer address. The number of physical addresses corresponding to one memory block in the L2P mapping table is not limited to that in the present embodiment.

In the L2P mapping table, first to seventh logical addresses LBA 1 to LBA 7 may be respectively mapped with first to seventh buffer addresses PBA_S 1 to PBA_S 7. The first and second buffer addresses PBA_S 1 and PBA_S 2 may be physical addresses of the first buffer block SLC1. The third and fourth buffer addresses PBA_S 3 and PBA_S 4 may be physical addresses of the second buffer block SLC2. The fifth and sixth buffer addresses PBA_S 5 and PBA_S 6 may be physical addresses of the third buffer block SLC3. The seventh buffer address PBA_S 7 may be a physical address of the fourth buffer block SLC4.

If a data migration operation is performed, the L2P mapping table may be updated. The first to sixth buffer addresses PBA_S 1 to PBA_S 6 that have been mapped with the first to sixth logical addresses LBA 1 to LBA6 may be respectively updated to first to sixth main addresses PBA_T 1 to PBA_T 6. The first to sixth main addresses PBA_T 1 and PBA_T 6 may be physical addresses of the first main block TLC1.

The mapping relationship between the seventh logical address LBA 7 and the seventh buffer address PBA_S 7 may be maintained. The seventh buffer address PBA_S 7 may be a physical address of the fourth buffer block SLC4 on which the data migration operation has not been performed.

In (b) of FIG. 9, the P2P mapping table may be generated when the data that has been stored in a buffer block is stored in a main block. The P2P mapping table may include mapping information between physical addresses of buffer blocks and physical addresses of a main block. For example, in the P2P mapping table, the first to sixth buffer addresses PBA_S 1 to PBA_S 6 may be respectively mapped with the first to sixth main addresses PBA_T 1 to PBA_T 6.

In (c) of FIG. 9, the lookup table may be generated based on the P2P mapping table. The lookup table may include indexes of the memory blocks. Here, the memory blocks may be main blocks that are indicated by the main addresses included in the P2P mapping table. For example, a main block that is indicated by the first to sixth main addresses PBA_T 1 to PBA_T 6 included in the P2P mapping table may be the first main block TLC1. Therefore, the lookup table may store the index of the first main block TLC1.

In an embodiment, in response to a read request received from the host described with reference to FIG. 1, an operation of reading data may be performed with reference to the L2P mapping table. In detail, based on the L2P mapping table, the operation of reading the data may be performed with reference to the physical address mapped with the logical address of data provided from the host. However, if the index of the memory block that is indicated by the main address is included in the lookup table, an operation of reading data may be performed with reference to the P2P mapping table. In other words, the operation of reading the data may be performed with reference to the buffer address mapped with the main address in the P2P mapping table.

For example, after the data migration operation has been performed, an operation of reading data corresponding to the fourth logical address LBA 4 among the data stored in the first main block TLC1 may be performed. Here, the operation of reading the data may be performed with reference to the fourth main address PBA_T 4 mapped with the fourth logical address LBA 4 in the L2P mapping table.

However, since the index of the first main block TLC1 that is the memory block indicated by the mapped fourth main address PBA_T 4 is included in the lookup table, the operation of reading the data may be performed with reference to the P2P mapping table. In detail, the operation of reading the data may be performed with reference to the fourth buffer address PBA_S 4 mapped with the fourth main address PBA_T 4 in the P2P mapping table. The fourth buffer address PBA_S 4 may be a physical address of the second buffer block SLC2.

The speed at which the data stored in the buffer block formed of single-level cells is read may be higher than the speed at which the data stored in the main block formed of triple-level cells. Therefore, when the data corresponding to the fourth logical address LBA 4 is read with reference to the fourth buffer address PBA_S 4 rather than the fourth main address PBA_T 4, the speed at which the data is read may be increased.

In an embodiment, after the data migration operation has been performed, an operation of reading data corresponding to the seventh logical address LBA 7 may be performed. The operation of reading the data may be performed with reference to the seventh buffer address PBA_S 7 mapped with the seventh logical address LBA 7 in the L2P mapping table. The index of the fourth buffer block SLC 4 that is a memory block indicated by the seventh buffer address PBA_S 7 is not included in the lookup table. Hence, the operation of reading the data corresponding to the seventh logical address LBA 7 with reference to the P2P mapping table may not be performed.

Figure 10:
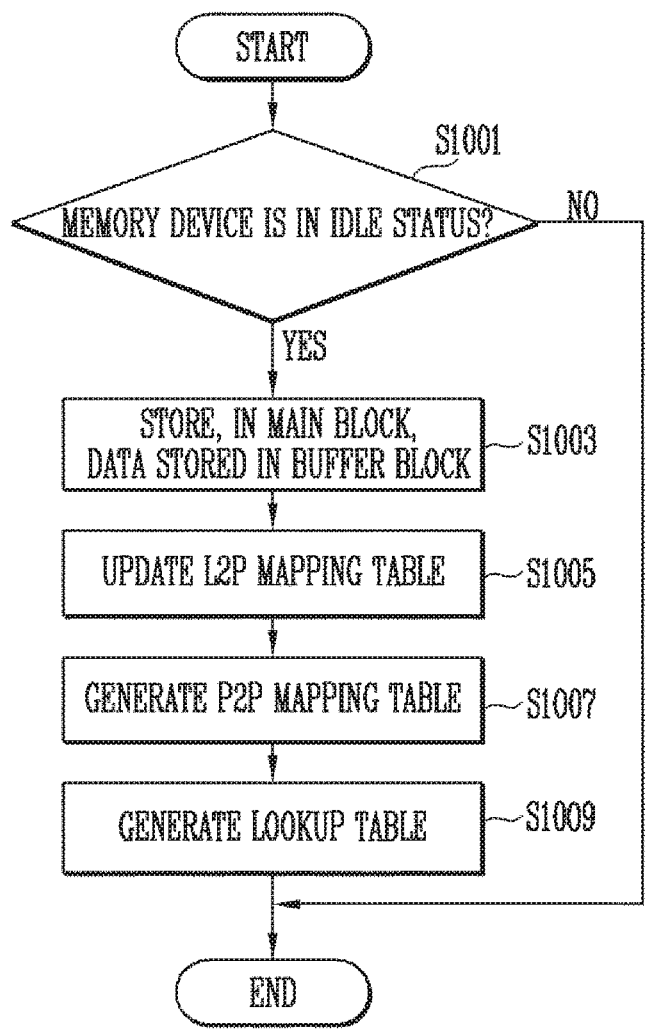
FIG. 10 is a flowchart illustrating an operation of the memory controller in accordance with an embodiment of the present disclosure.

FIG. 10 is a flowchart illustrating an operation of the memory controller in accordance with an embodiment of the present disclosure.

Referring to FIG. 10, at step S1001, the memory controller may determine whether the memory device is in an idle status. If the memory device is determined to be in an idle status (that is, "YES" at step S1001), the process proceeds to step S1003. If not (that is, "NO" at step S1001), the process is terminated.

At step S1003, the memory controller may store, in a main block, the data that is stored in one or more buffer blocks. In detail, the data stored in the buffer block(s) is read, and then stored in the main block.

At step S1005, the memory controller may update the L2P mapping table. The L2P mapping table may include mapping information between a logical address of the data provided from the host and a buffer address, which is a physical address of the buffer block in which the data is stored. The memory controller may update the physical address mapped with the logical address included in the L2P mapping table from the buffer address to a main address. The main address may be a physical address of the main block in which the data is stored.

At step S1007, the memory controller may generate a P2P mapping table. The P2P mapping table may include mapping information between the buffer address and the main address.

At step S1009, the memory controller may generate a lookup table with reference to the P2P mapping table. The lookup table may include indexes of memory blocks which indicate main addresses included in the P2P mapping table.

Figure 11:
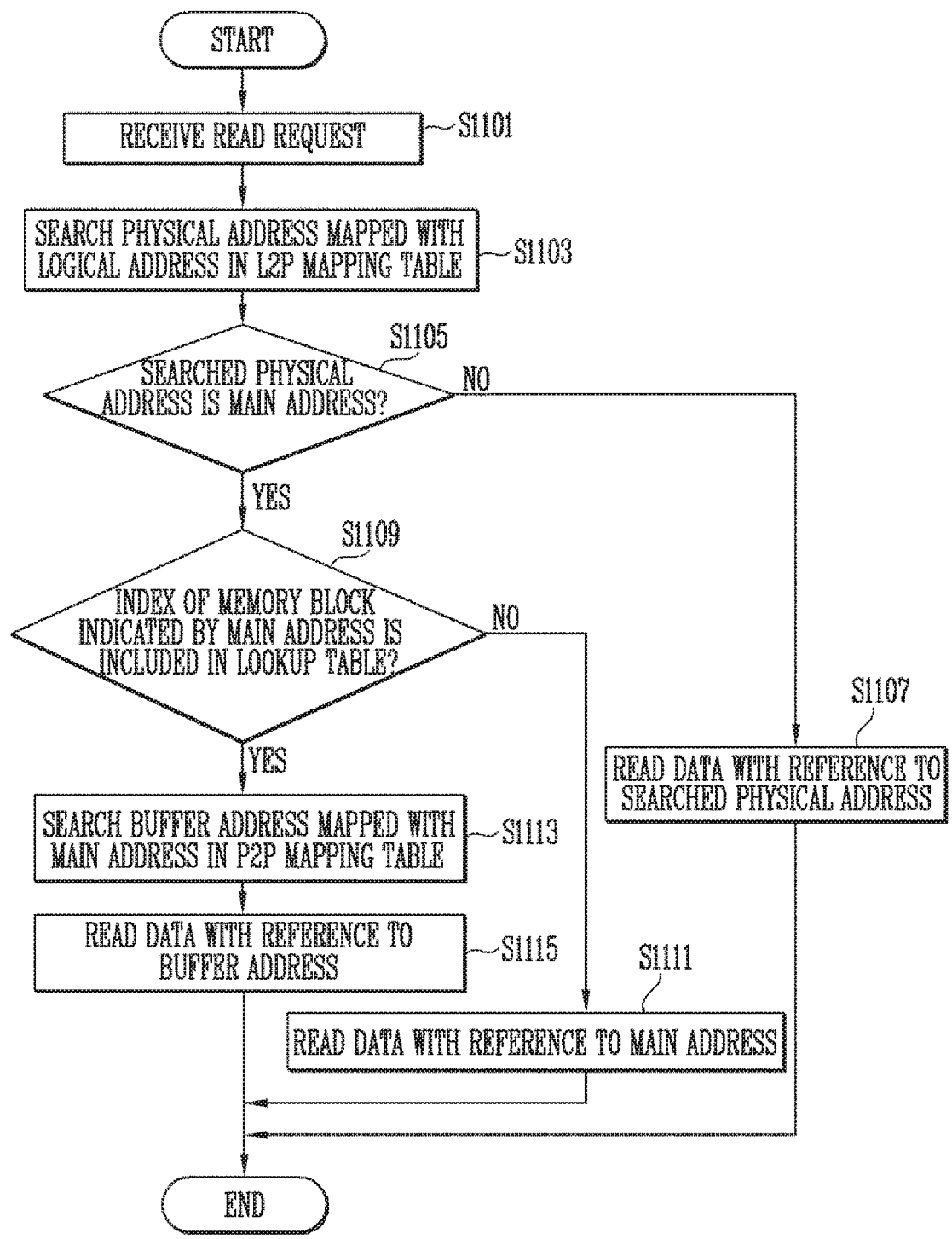
FIG. 11 is a flowchart illustrating an operation of the memory controller in accordance with an embodiment of the present disclosure.

FIG. 11 is a flowchart illustrating an operation of the memory controller in accordance with an embodiment of the present disclosure.

Referring to FIG. 11, at step 1101, the memory controller may receive a read request from the host.

At step S1103, the memory controller may search for a physical address mapped with a logical address of data to be read in response to a read request in the L2P mapping table. The logical address may be provided from the host.

At step S1105, the memory controller may determine whether the physical address found in the search is a main address or a buffer address. If as a result of the determination the found physical address is a main address (that is, "YES" at step S1105), the process proceeds to step S1109. If the found physical address is the buffer address (that is, "NO" at step S1105), the process proceeds to step S1107. The main address may be a physical address of the main block in which the data is stored.

At step S1107, the memory controller may read the data from the buffer blocks with reference to the buffer address.

At step S1109, the memory controller may determine whether the index of the memory block indicated by the main address is included in the lookup table. If as a result of the determination the index of the memory block is included in the lookup table (that is, "YES" at step S1109), the process proceeds to step S1113. If not (that is, "NO" at step S1109), the process proceeds to step S1111.

At step S1111, the memory controller may read data with reference to the main address.

At step S1113, the memory controller may search for a buffer address mapped with the main address in the P2P mapping table. The buffer address may be a physical address of the buffer block in which the data is stored.

At step S1115, the memory controller may read data with reference to the buffer address.

Figure 12:
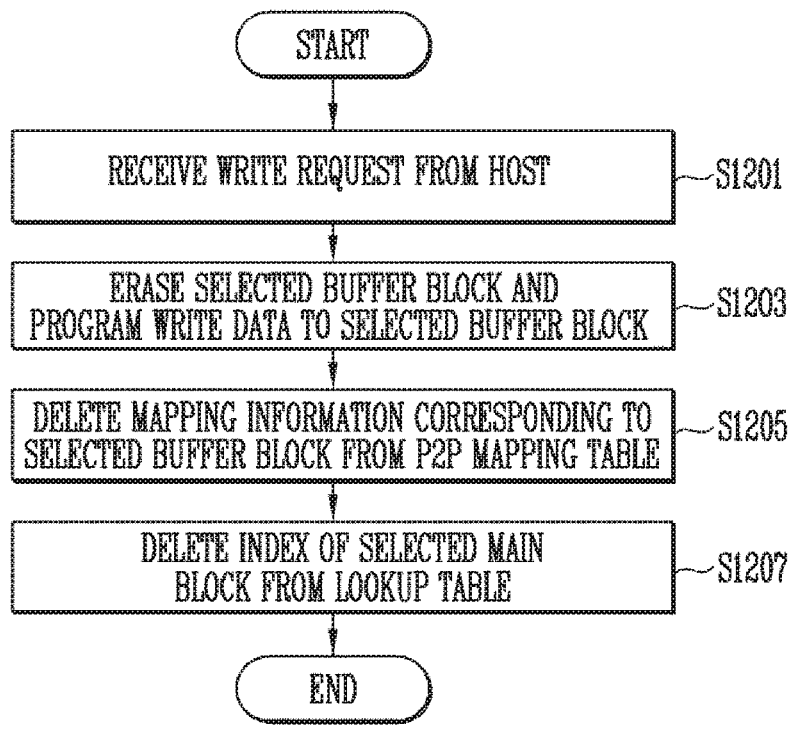
FIG. 12 is a flowchart illustrating an operation of the memory controller in accordance with an embodiment of the present disclosure.

FIG. 12 is a flowchart illustrating an operation of the memory controller in accordance with an embodiment of the present disclosure.

Referring to FIG. 12, at step 1201, the memory controller may receive a write request from the host.

At step S1203, the memory controller may control the memory device such that the memory device erases a selected buffer block and then stores write data in the erased selected buffer block. In detail, the memory controller may provide a program command for storing the write data in the selected buffer block to the memory device.

At step S1205, the memory controller may update the P2P mapping table. In detail, mapping information corresponding to the data stored erased from the buffer block may be deleted from the P2P mapping table.

At step S1207, the lookup table may be updated based on the updated P2P mapping table. The memory controller may delete the index of the main block, which corresponds to the mapping information deleted from the P2P mapping table, from the lookup table.

Figure 13:
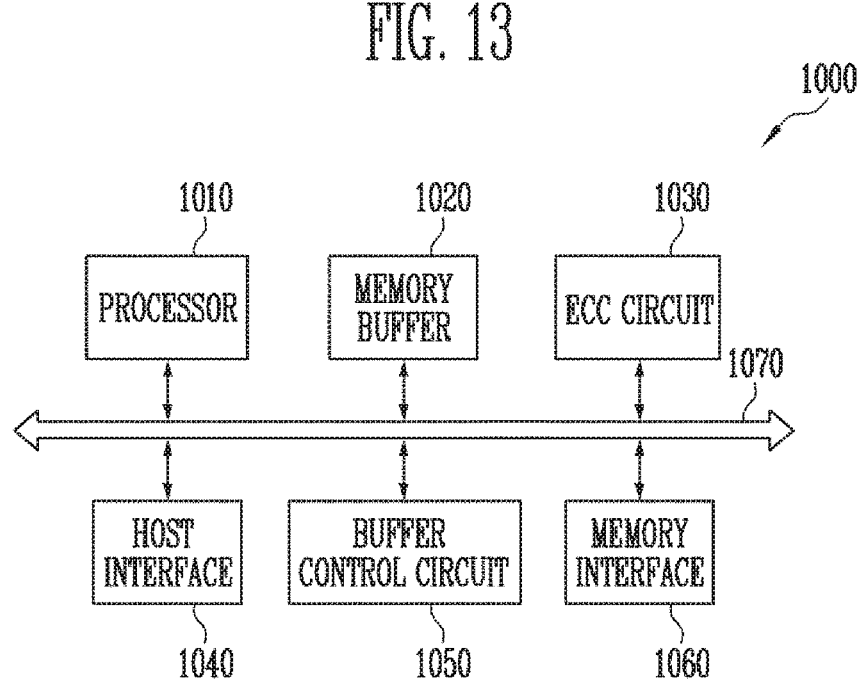
FIG. 13 is a diagram illustrating an embodiment of the memory controller of FIG. 1.

FIG. 13 is a diagram illustrating an embodiment of the memory controller of FIG. 1.

Referring to FIG. 13, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Various address mapping methods may be applied using the FTL depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

In another embodiment, the memory controller 1000 may include neither the memory buffer 1020 nor the buffer control circuit 1050. Either of these components may be provided separately, or one or both of their functions may be distributed within the memory controller 100.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
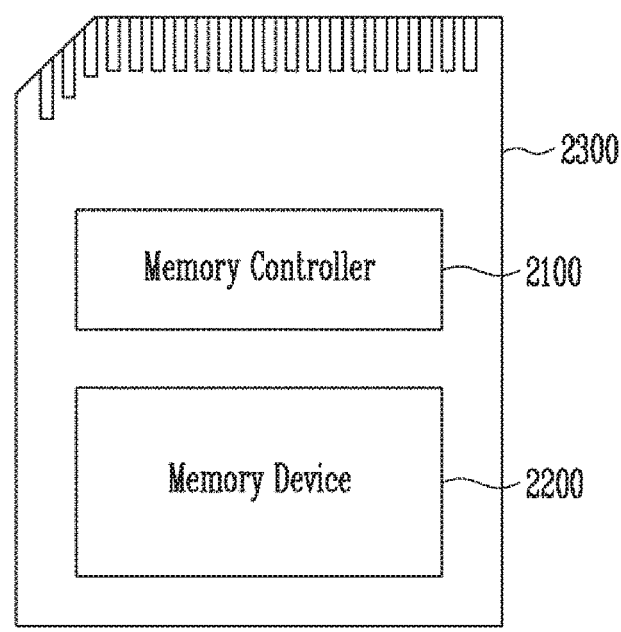
FIG. 14 is a block diagram illustrating a memory card system to which the storage device is applied in accordance with an embodiment of the present disclosure.

FIG. 14 is a block diagram illustrating a memory card system 2000 to which the storage device is applied in accordance with an embodiment of the present disclosure.

Referring FIG. 14, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card, such as a personal computer memory card international association (PCMCIA), a compact flash (CF) card, a smart media card (SM or SMC), a memory stick, a multimedia card (MMC, RS-MMC, or MMCmicro), a SD card (SD, miniSD, microSD, or SDHC), or a universal flash storage (UFS).

Figure 15:
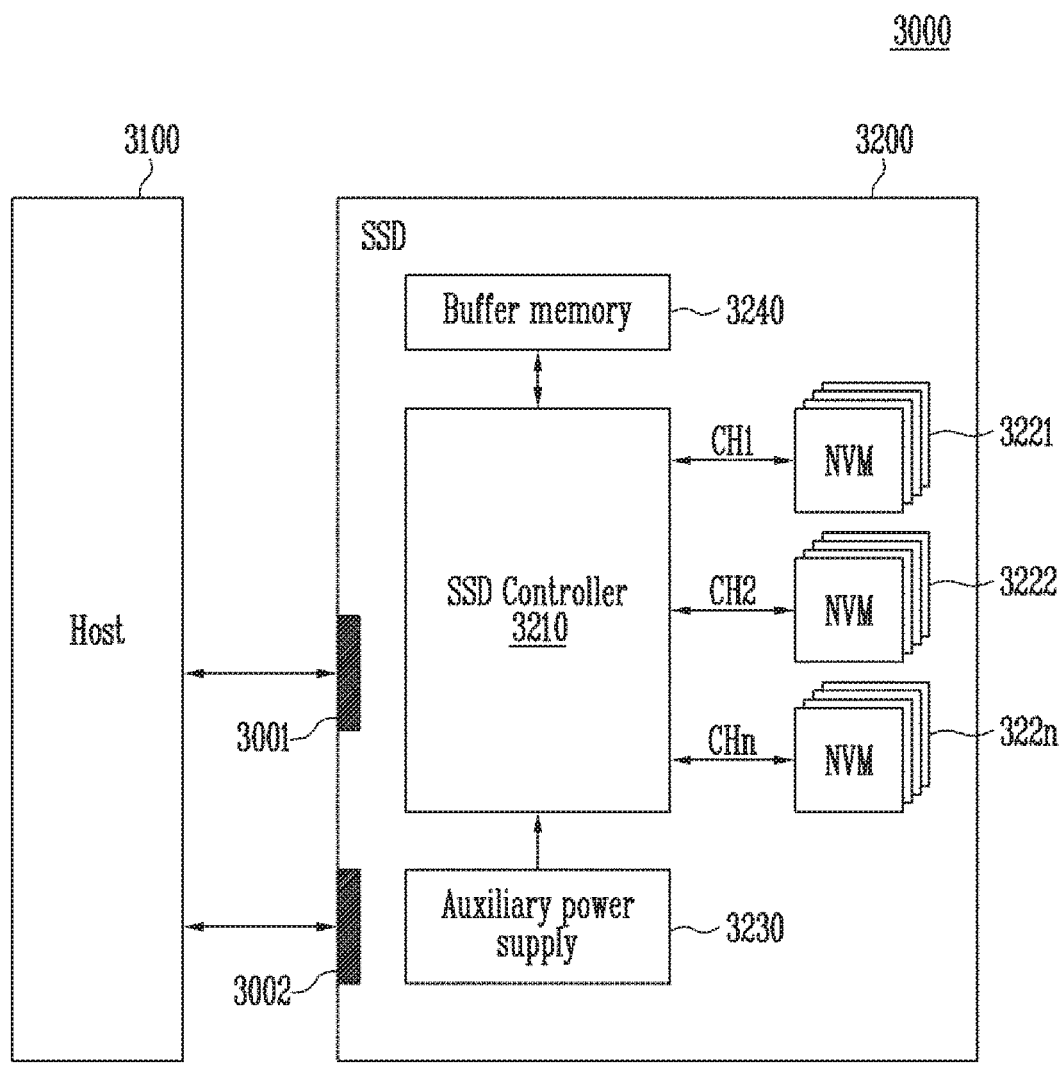
FIG. 15 is a block diagram illustrating a solid state drive (SSD) system to which the storage device is applied in accordance with an embodiment of the present disclosure.

FIG. 15 is a block diagram illustrating a solid state drive (SSD) system 3000 to which the storage device is applied in accordance with an embodiment of the present disclosure.

Referring to FIG. 15, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be based on an interface between the host 3100 and the SSD 3200. For example, the signals SIG may be defined by at least one of various interfaces, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be disposed within the SSD 3200 or externally to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 16:
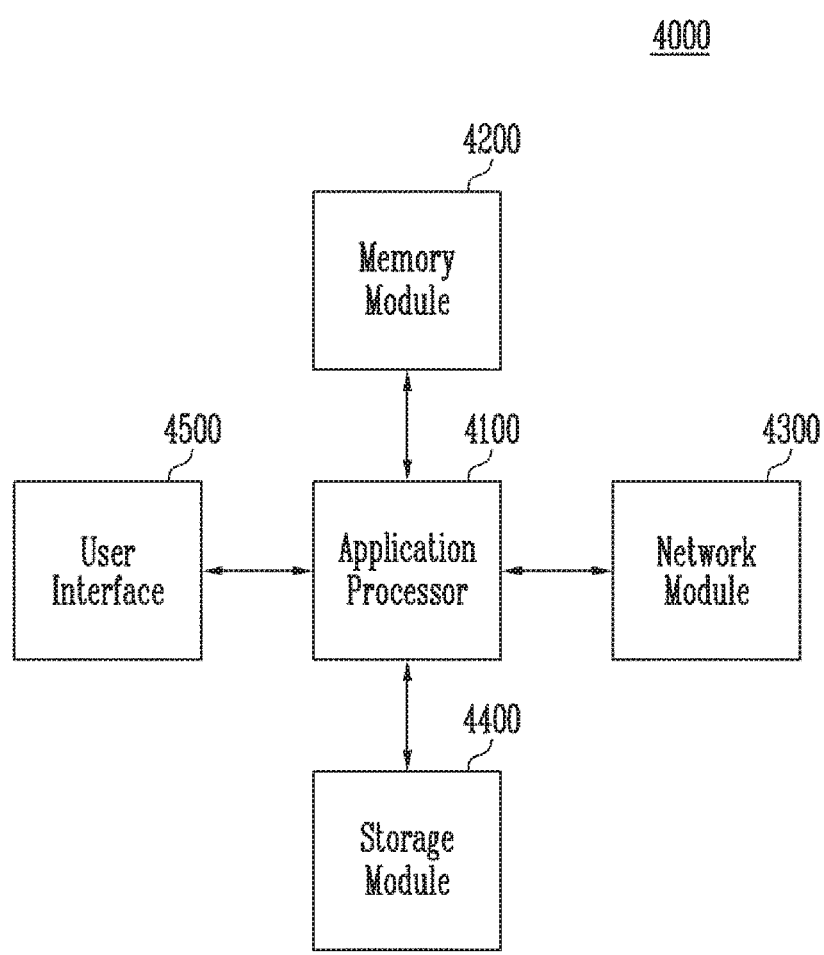
FIG. 16 is a block diagram illustrating a user system to which the storage device is applied in accordance with an embodiment of the present disclosure.

FIG. 16 is a block diagram illustrating a user system 4000 to which the storage device is applied in accordance with an embodiment of the present disclosure.

Referring to FIG. 16, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50, described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a monitor.

As described above, various embodiments of the present disclosure may provide a storage device having improved read performance, and a method of operating the storage device.

Although embodiments of the present disclosure have been disclosed, those skilled in the art will appreciate in light of the present disclosure that various modifications, additions and substitutions are possible, without departing from the scope and spirit of the present disclosure.

Therefore, the scope of the present invention must be defined by the appended claims and equivalents thereof rather than by the description preceding them.

In the above-discussed embodiments, one or more steps may be selectively performed or skipped. In addition, the steps in each embodiment may not be always performed in regular order. Furthermore, embodiments disclosed herein aim to help those with ordinary knowledge in this art more clearly understand the present disclosure rather than aiming to limit the bounds of the present invention. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter of the present invention. It should be understood that many variations and modifications of the basic inventive concept described herein will still fall within the spirit and scope of the present invention as defined in the appended claims and their equivalents.

What is claimed is:

1. A memory controller configured to control a memory device including a plurality of buffer blocks and a plurality of main blocks, the memory controller comprising:
    a buffer block controller configured to control the memory device to store, in at least one main block of the plurality of main blocks, data stored in at least one buffer block of the plurality of buffer blocks;
    a mapping table manager configured to generate a physical-to-physical (P2P) mapping table including mapping information between a buffer address that is a physical address of the at least one buffer block and a main address that is a physical address of the at least one main block when the data that has been stored in the at least one buffer block is stored in the at least one main block; and
    a read operation controller configured to control, when a read request for the data is received from a host, the memory device to read the data based on the main address or the buffer address included in the P2P mapping table,
    wherein the P2P mapping table is used until the at least one buffer block is erased.

2. The memory controller according to claim 1, wherein, when the data is stored in the at least one buffer block, the mapping table manager generates a logical-to-physical (L2P) mapping table including mapping information between a logical address of the data provided from the host and the buffer address.

3. The memory controller according to claim 2, wherein, when the data stored in the at least one buffer block is stored in the at least one main block, the mapping table manager changes the physical address mapped with the logical address included in the L2P mapping table from the buffer address to the main address.

4. The memory controller according to claim 3, wherein, when a selected buffer block of the at least one buffer block is erased, the mapping table manager deletes mapping information corresponding to the erased buffer block from the P2P mapping table.

5. The memory controller according to claim 3, wherein the read operation controller controls the memory device to read the data based on the main address or the buffer address mapped to a read-requested logical address by the L2P mapping table depending on whether the main address mapped to the read-requested logical address is included in the P2P mapping table.

6. The memory controller according to claim 5, wherein, when the main address mapped to the read-requested logical address is included in the P2P mapping table, the read operation controller controls the memory device to read the data based on the buffer address mapped to the main address in the P2P mapping table.

7. The memory controller according to claim 5, wherein, when the main address mapped to the read-requested logical address is not included in the P2P mapping table, the read operation controller controls the memory device to read the data based on the main address.

8. The memory controller according to claim 3, wherein the mapping table manager generates a lookup table including an index indicating the main address in the P2P mapping table.

9. The memory controller according to claim 8, wherein the read operation controller controls the memory device to read the data based on the main address or the buffer address mapped to a read-requested logical address by the L2P mapping table depending on whether the index corresponding to the main address mapped to the read-requested logical address is included in the lookup table.

10. The memory controller according to claim 9, wherein, when the index corresponding to the main address mapped to the read-requested logical address is included in the lookup table, the read operation controller controls the memory device to read the data based on the buffer address mapped to the main address in the P2P mapping table.

11. The memory controller according to claim 1,
wherein each of memory cells of the plurality of buffer blocks stores n bits (n is a natural number of 1 or more), and
wherein each of memory cells of the plurality of main blocks stores m bits (m is a natural number greater than n).

12. The memory controller according to claim 1, wherein, when the memory device is in an idle status, the buffer block controller stores, in the at least one main block, the data stored in the at least one buffer block.

13. A storage device comprising:
a memory device including a plurality of buffer blocks and a plurality of main blocks; and
a memory controller configured to control the memory device to:
store, in at least one main block of the plurality of main blocks, data stored in at least one buffer block of the plurality of buffer blocks;
generate, when the data that has been stored in the at least one buffer block is stored in the at least one main block, a physical-to-physical (P2P) mapping table including mapping information between a buffer address that is a physical address of the at least one buffer block and a main address that is a physical address of the at least one main block; and
read, when a read request for the data is received from a host, the data based on the main address or the buffer address included in the P2P mapping table,
wherein the P2P mapping table is used until the at least one buffer block is erased.

14. The storage device according to claim 13,
wherein the memory controller generates, when the data is stored in the at least one buffer block, a logical-to-physical (L2P) mapping table including mapping information between a logical address of the data provided from the host and the buffer address, and
wherein the memory controller changes, when the data stored in the at least one buffer block is stored in the at least one main block, the physical address mapped with the logical address included in the L2P mapping table from the buffer address to the main address.

15. The storage device according to claim 14, wherein, when a read request for the data is received from the host, the memory controller controls the memory device to read the data based on the main address or the buffer address mapped to a read-requested logical address by the L2P mapping table depending on whether the main address mapped to the read-requested logical address is included in the P2P mapping table.

16. The storage device according to claim 15, wherein, when the main address mapped to the read-requested logical address is included in the P2P mapping table, the memory controller controls the memory device to read the data based on the buffer address mapped to the main address in the P2P mapping table.

17. The storage device according to claim 15, wherein, when the main address mapped to the read-requested logical address is not included in the P2P mapping table, the memory controller controls the memory device to read the data based on the main address.

18. The storage device according to claim 13, wherein, when a selected buffer block of the at least one buffer block is erased, the memory controller deletes mapping information corresponding to the erased buffer block from the P2P mapping table.

19. A memory system comprising:
a memory device including a first memory region of lower-density storage and a second memory region of higher-density storage; and
a controller that:
controls the memory device to copy data from the first memory region into the second memory region;
updates first map information including a logical address mapped to a first physical address representing where the data is stored in the first memory region by replacing the first physical address with a second physical address where the data is copied in the second memory region;
generates second map information including the first physical address mapped to the second physical address when the data is copied from the first memory region into the second memory region; and
accesses the first memory region when the first map information includes the second physical address mapped to an access-requested logical address and the second map information includes the first physical address mapped to the second physical address,
wherein the second map information is used until the first memory region is erased.

* * * * *